United States Patent
Jang et al.

(10) Patent No.: US 10,474,280 B2
(45) Date of Patent: Nov. 12, 2019

(54) TOUCH SENSING SYSTEM INCLUDING ACTIVE STYLUS PEN

(71) Applicant: LG Display Co., Ltd., Seoul (KR)

(72) Inventors: Hyunguk Jang, Gyeonggi-do (KR); Cheolse Kim, Daegu (KR); Sungchul Kim, Gyeonggi-do (KR); Sanghyuck Bae, Gyeonggi-do (KR); Sungsu Han, Gyeonggi-do (KR); Suyun Ju, Gangwon-do (KR); Doyoung Jung, Seoul (KR)

(73) Assignee: LG Display Co., Ltd., Seoul (KR)

( * ) Notice: Subject to any disclaimer, the term of this patent is extended or adjusted under 35 U.S.C. 154(b) by 23 days.

(21) Appl. No.: 15/381,410

(22) Filed: Dec. 16, 2016

(65) Prior Publication Data
US 2017/0192591 A1 Jul. 6, 2017

(30) Foreign Application Priority Data

Dec. 31, 2015 (KR) .................. 10-2015-0191807
Dec. 2, 2016 (KR) .................. 10-2016-0163495

(51) Int. Cl.
*G06F 3/041* (2006.01)
*G06F 3/0354* (2013.01)
(Continued)

(52) U.S. Cl.
CPC .......... *G06F 3/0416* (2013.01); *G06F 3/0383* (2013.01); *G06F 3/03545* (2013.01); *G06F 3/0412* (2013.01); *G06F 3/044* (2013.01)

(58) Field of Classification Search
CPC .. G06F 3/0416; G06F 3/03545; G06F 3/0383; G06F 3/0412; G06F 3/044
See application file for complete search history.

(56) References Cited

U.S. PATENT DOCUMENTS

2007/0075710 A1* 4/2007 Hargreaves ........ G01R 27/2605
324/658
2010/0123708 A1 5/2010 Jang et al.
(Continued)

FOREIGN PATENT DOCUMENTS

CN 102866792 A 1/2013
EP 2 339 432 A2 6/2011
(Continued)

OTHER PUBLICATIONS

Extended European Search Report dated Aug. 9, 2017, issued in corresponding European Patent Application No. 16205763.2.
(Continued)

*Primary Examiner* — Lisa S Landis
(74) *Attorney, Agent, or Firm* — Morgan, Lewis & Bockius LLP

(57) ABSTRACT

A touch sensing system is disclosed. The touch sensing system includes an active stylus pen that generates a first pen driving signal for detecting a touch input in synchronization with a touch driving signal input from a touch screen and a second pen driving signal for detecting an additional input related to an additional function of the active stylus pen in a touch driving period and outputs the first and second pen driving signals to the touch screen; and a touch driving device that applies the touch driving signal to the touch screen, senses the first pen driving signal in a first period of the touch driving period, and senses the second pen driving signal in a second period of the touch driving period.

12 Claims, 11 Drawing Sheets

(51) Int. Cl.
*G06F 3/038* (2013.01)
*G06F 3/044* (2006.01)

(56) References Cited

U.S. PATENT DOCUMENTS

| | | | |
|---|---|---|---|
| 2011/0122087 A1 | 5/2011 | Jang et al. | |
| 2012/0050207 A1* | 3/2012 | Westhues | G06F 3/03545 |
| | | | 345/174 |
| 2014/0145996 A1* | 5/2014 | Sugita | G06F 3/044 |
| | | | 345/173 |
| 2014/0176495 A1 | 6/2014 | Vlasov | |
| 2014/0354555 A1 | 12/2014 | Shahparnia et al. | |
| 2015/0035768 A1* | 2/2015 | Shahparnia | G06F 3/041 |
| | | | 345/173 |

FOREIGN PATENT DOCUMENTS

| | | | |
|---|---|---|---|
| EP | 2339432 | * | 6/2011 |
| KR | 10-2004-0061488 A | | 7/2004 |
| KR | 10-2011-0057501 A | | 6/2011 |
| KR | 10-2015-0078571 A | | 7/2015 |
| WO | 2015/200396 A1 | | 12/2015 |

OTHER PUBLICATIONS

Office Action dated Jul. 2, 2019, issued in corresponding Chinese Patent Application No. 201611226916.4.

* cited by examiner

FIG. 15

| Case | 3-states ||
| | 2-symbol | 3-symbol |
|---|---|---|
| 1 | 00 | 000 |
| 2 | 01 | 001 |
| 3 | 0 | 00 |
| 4 | 10 | 010 |
| 5 | 11 | |
| 6 | 1 - | 01 - |
| 7 | - 0 | 0 - |
| 8 | 01 | 0 - |
| 9 | - - | 0 - - |
| ...... | X | ...... |
| 26 | X | - - |
| 27 | X | - - - |

TOUCH SENSING SYSTEM INCLUDING ACTIVE STYLUS PEN

This application claims the benefit of Korea Patent Application Nos. 10-2015-0191807 and 10-2016-0163495 filed on Dec. 31, 2015 and Dec. 2, 2016, which are incorporated herein by reference for all purposes as if fully set forth herein.

BACKGROUND OF THE INVENTION

Field of the Invention

The present disclosure relates to a touch sensing system, and more particularly, to a touch sensing system capable of performing a touch input using an active stylus pen.

Discussion of the Related Art

User interface (UI) is configured so that users are able to communicate with various electronic devices and thus can easily and comfortably control the electronic devices as they desire. Examples of the user interface include a keypad, a keyboard, a mouse, an on-screen display (OSD), and a remote controller having an infrared communication function or a radio frequency (RF) communication function. User interface technology has continuously expanded to increase user's sensibility and handling convenience. The user interface has been recently developed to include touch UI, voice recognition UI, 3D UI, etc.

A touch UI has been necessarily adopted to portable information appliances. The touch UI is implemented by forming a touch screen on the screen of a display device. The touch screen may be implemented as a capacitive touch screen. The touch screen having capacitive touch sensors senses changes (i.e., changes in charges of the touch sensor) in a capacitance resulting from an input of a touch driving signal when a user touches (or approaches) the touch sensor with his or her finger or a conductive material, and thus detects a touch input.

A stylus pen has been recently used as a human interface device (HID) in smart phones, smart books, and the like. The stylus pen is advantageous to perform more detailed inputs than fingers. The stylus pen includes a passive stylus pen and an active stylus pen. It is difficult for the passive stylus pen to detect a touch location of a touch screen contacting the passive stylus pen because of a small change in a capacitance at the touch location. Compared with the passive stylus pen, it is easier for the active stylus pen to detect a touch location of the touch screen contacting the active stylus pen because the active stylus pen generates a pen driving signal and outputs the pen driving signal to the touch location. Hence, the development of the active stylus pen has been focused.

In a related art touch sensing system, an active stylus pen transferred additional information (for example, pen pressure information) of the active stylus pen separately from a pen driving signal to a touch integrated circuit (IC), so as to implement various convenient functions. To this end, the related art active stylus pen individually transferred the pen driving signal and the additional pen information to the touch IC through a modulation method using a sine wave of a high frequency (for example, several MHz to several tens of MHz). The touch IC dividedly processed the pen driving signal and the additional pen information using a bandpass filter, a detection circuit, etc. The pen driving signal and the additional pen information had a frequency much higher than a touch driving signal for driving a touch screen.

Because the related art touch sensing system has to add a complex processing circuit for dividing the pen driving signal and the additional pen information to the touch IC, the size and the manufacturing cost of the touch IC increased.

Furthermore, the related art touch sensing system may be applied only to an add-on touch screen and cannot be applied to an in-cell touch screen. The add-on touch screen uses a touch screen formation method for attaching a touch screen to a display panel, and the in-cell touch screen uses a touch screen formation method for embedding touch sensors of a touch screen in a pixel array of a display panel.

Because touch sensors of the in-cell touch screen are coupled with pixel signal lines through a parasitic capacitance, an RC delay of the in-cell touch screen is greater than an RC delay of the add-on touch screen. Thus, it is difficult for the in-cell touch screen to accurately transfer the pen driving signal and the additional pen information of the high frequencies to the touch IC as in the related art touch sensing system because of lack of RC time.

SUMMARY

Accordingly, the present invention is directed to a touch sensing system including active stylus pen that substantially obviates one or more of the problems due to limitations and disadvantages of the related art.

An object of the present disclosure is to provide a touch sensing system capable of accurately receiving and processing additional pen information input from an active stylus pen in the touch sensing system including an in-cell touch screen, in which touch sensors are embedded in a pixel array of a display panel, and the active stylus pen.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a touch sensing system, in which one frame is time-divided into at least one touch driving period and a display driving period, comprises an active stylus pen configured to generate a first pen driving signal for detecting a touch input in synchronization with a touch driving signal input from a touch screen and a second pen driving signal for detecting an additional input related to an additional function of the active stylus pen in the touch driving period and output the first pen driving signal and the second pen driving signal to the touch screen; and a touch driving device configured to apply the touch driving signal to the touch screen, sense the first pen driving signal input through the touch screen in a first period of the touch driving period, and sense the second pen driving signal input through the touch screen in a second period of the touch driving period.

In another aspect, a touch driving device is provided in which one frame is time-divided into at least one touch driving period and a display driving period and which operates in the at least one touch driving period, wherein the touch driving device generates a touch driving signal during the touch driving period, applies the touch driving signal to a touch screen, senses a first pen driving signal applied to the touch screen from a stylus pen in a first period of the touch driving period, and senses a second pen driving signal applied to the touch screen from the stylus pen in a second period of the touch driving period. The first pen driving signal and the second pen driving signal are synchronized with the touch driving signal. The first pen driving signal is used to detect a touch input, and the second pen driving signal is used to detect an additional input related to an additional function of the stylus pen.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 15 illustrates an amount of information that can be transmitted when a second pen driving signal is generated in three states.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 1:
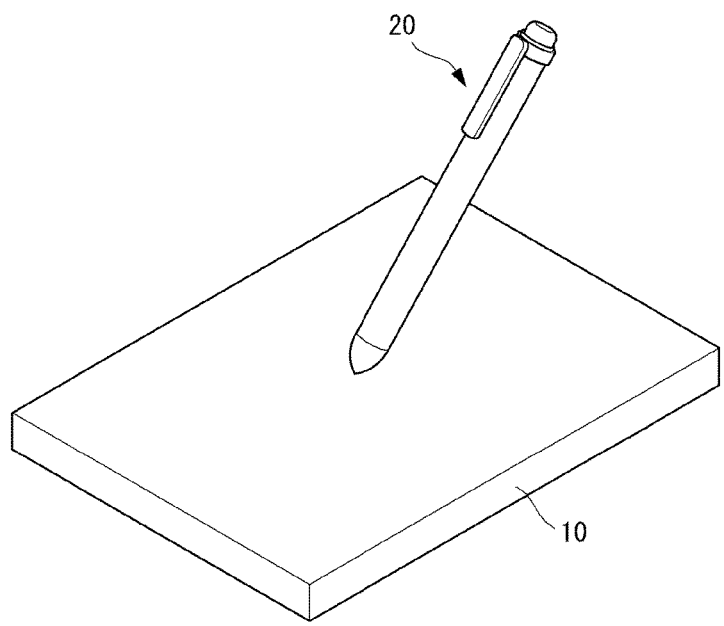
FIG. 1 schematically illustrates a touch sensing system according to an embodiment of the invention.

FIG. 1 schematically illustrates a touch sensing system according to an embodiment of the invention.

Referring to FIG. 1, a touch sensing system according to an embodiment of the invention includes a display device 10 and an active stylus pen 20.

The display device 10 performs a display function and a touch detection function. The display device 10 is capable to detect a touch input of a conductive object, such as a finger or the active stylus pen 20, and includes an integrated capacitive touch screen embedded therein. In embodiment disclosed herein, the touch screen is implemented as an in-cell touch screen, in which touch sensors are embedded in a pixel array of a display panel. Detailed configuration and operation of the display device 10 will be described later with reference to FIGS. 2 to 4 and FIGS. 9 to 12.

The active stylus pen 20 operates in an Rx mode and a Tx mode based on a touch sync signal. The active stylus pen 20 generates a first pen driving signal for detecting a touch input in synchronization with a touch driving signal received from the touch screen and a second pen driving signal for detecting an additional input related to an additional function of the active stylus pen 20 and successively outputs the first pen driving signal and the second pen driving signal at a touch location between the touch screen and the active stylus pen 20, thereby easily detecting the touch location on the touch screen. In particular, because the active stylus pen 20 processes the second pen driving signal at the same frequency as the touch driving signal and then outputs the processed second pen driving signal at a time interval from the first pen driving signal, there is an advantage in that more accurate information can be transmitted. Configuration and operation of the active stylus pen 20 will be described later with reference to FIGS. 5 to 8.

Figure 2:
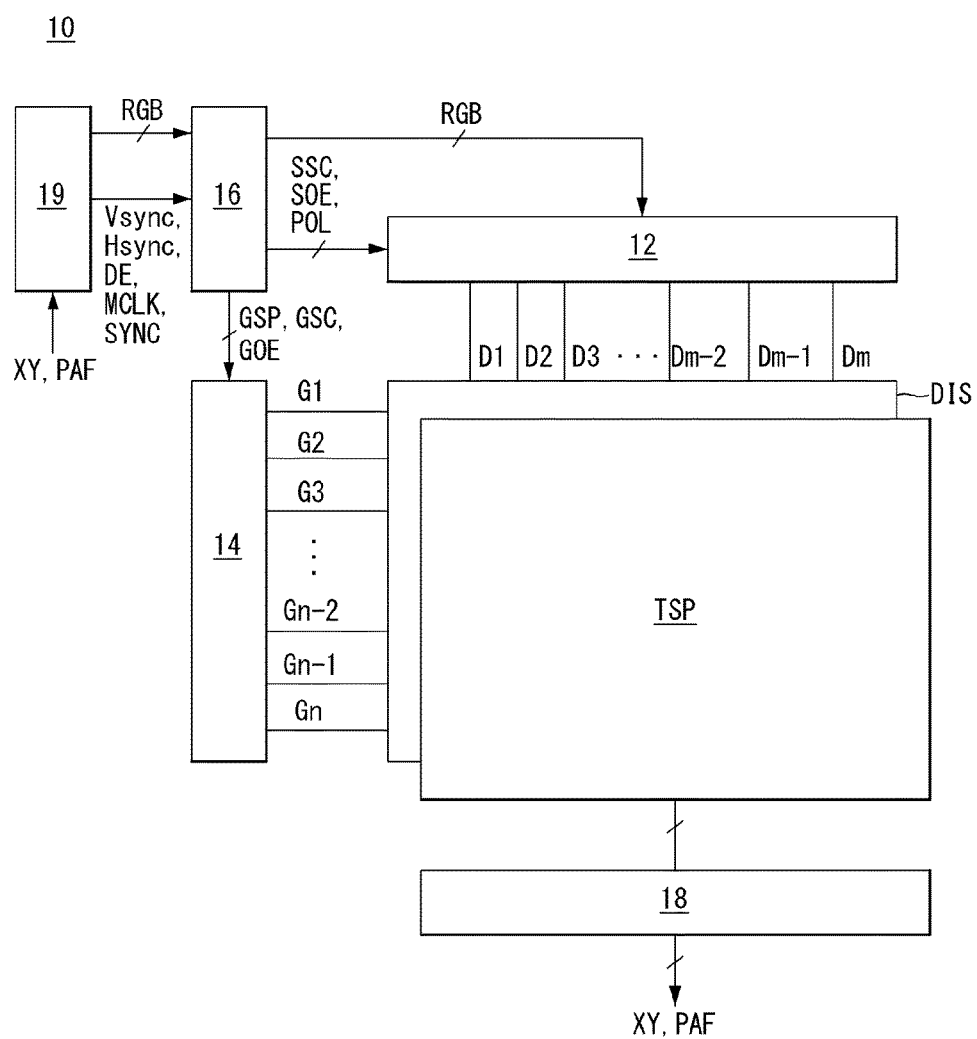
FIG. 2 illustrates a display device to which a touch sensing system according to an embodiment of the invention is applied.
Figure 3:
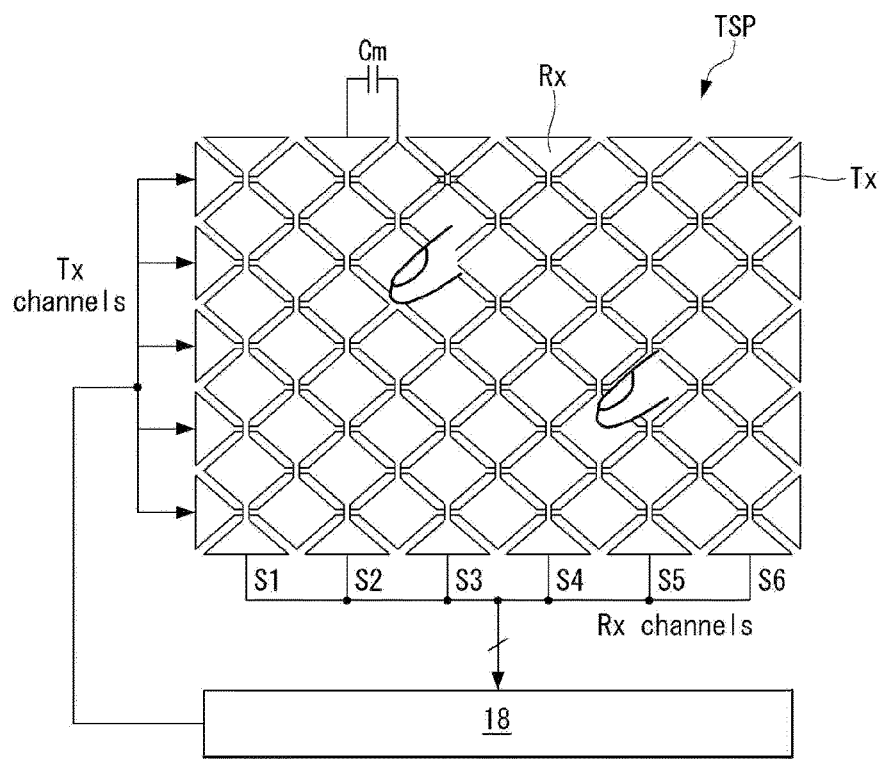
FIG. 3 illustrates an example of a touch screen that is implemented by an in-cell mutual capacitance sensor and included in a display device shown in FIG. 2.
Figure 4:
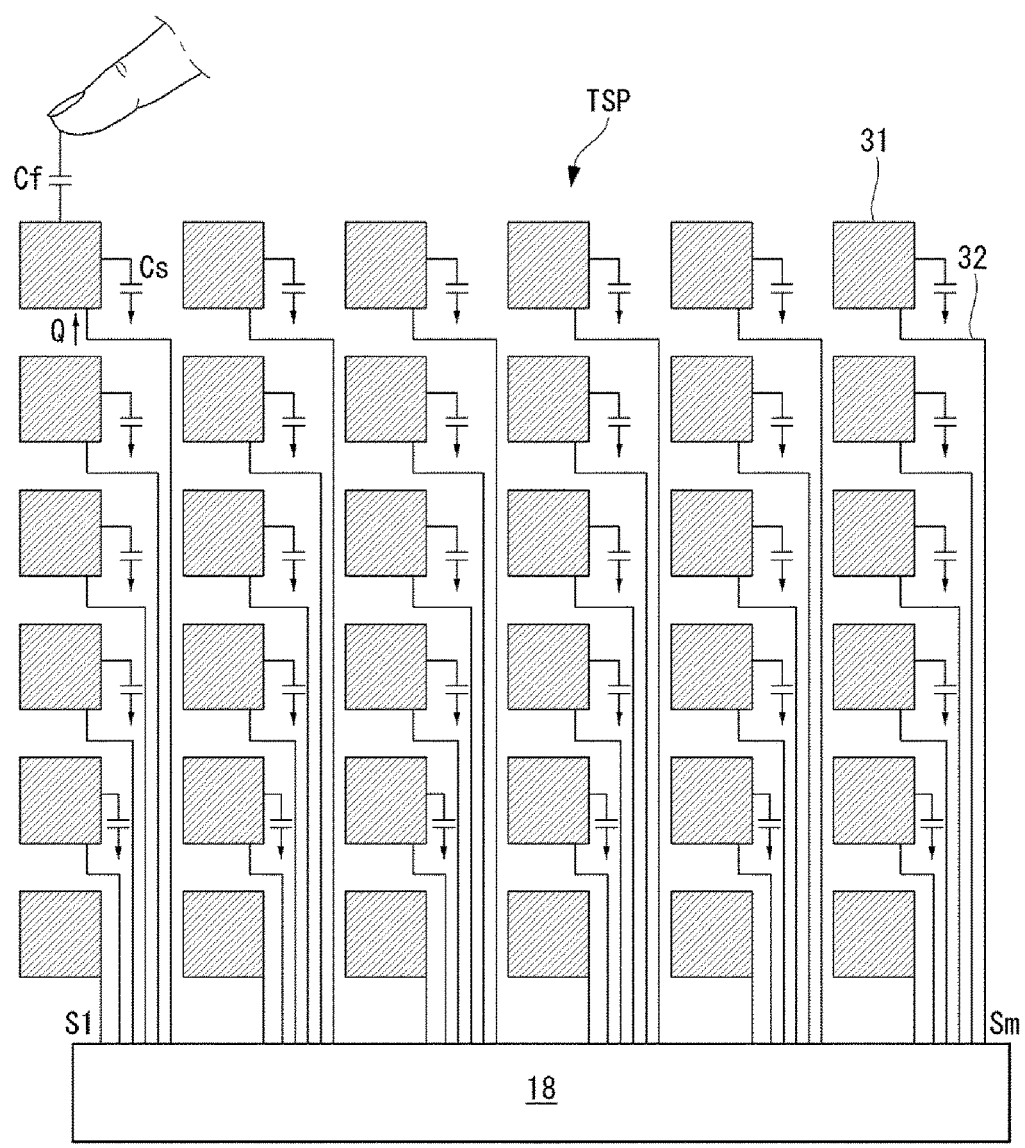
FIG. 4 illustrates an example of a touch screen that is implemented by an in-cell self-capacitance sensor and included in a display device shown in FIG. 2.

FIG. 2 illustrates a display device to which the touch sensing system according to the embodiment of the invention is applied. FIGS. 3 and 4 illustrate that a touch screen included in a display device shown in FIG. 2 is implemented by an in-cell mutual capacitance sensor and an in-cell self-capacitance sensor.

Referring to FIGS. 2 to 4, the display device 10 according to the embodiment of the invention may be implemented based on a flat panel display, such as a liquid crystal display (LCD), a field emission display (FED), a plasma display panel (PDP), an organic light emitting diode (OLED) display, and an electrophoresis display (EPD). In the following description, embodiments of the invention will be described using a liquid crystal display as an example of a flat panel display. However, embodiments of the invention are not limited thereto, and other flat panel displays may be used.

The display device 10 includes a display module and a touch module.

The touch module includes a touch screen TSP and a touch driving device 18.

The touch screen TSP may be implemented in a capacitive manner of sensing a touch input through a plurality of capacitive sensors. The touch screen TSP includes a plurality of touch sensors each having a capacitance. The capacitance may be divided into a self-capacitance and a mutual capacitance. The self-capacitance may be formed along a conductor line of a single layer formed in one direction, and the mutual capacitance may be formed between two conductor lines perpendicular to each other.

As shown in FIG. 3, a touch screen TSP implemented by mutual capacitance sensors Cm may include Tx electrode lines, Rx electrode lines crossing the Tx electrode lines, and touch sensors Cm respectively formed at crossings of the Tx electrode lines and the Rx electrode lines. The Tx electrode lines are driving signal lines supplying charges to the touch sensors Cm by applying a touch driving signal to each touch sensor Cm. The Rx electrode lines are sensor lines that are connected to the touch sensors Cm and supply charges of the touch sensors Cm to the touch driving device 18. In a mutual capacitance sensing method, charges are supplied to the touch sensors Cm by applying the touch driving signal to Tx electrodes through the Tx electrode lines, and changes in capacitances of the touch sensors Cm are sensed through Rx electrodes and the Rx electrode lines in synchronization with the touch driving signal, whereby a touch input may be recognized.

As shown in FIG. 4, in a touch screen TSP implemented by self-capacitance sensors Cs, electrodes 31 may be connected to sensor lines 32 formed along one direction, respectively. The self-capacitance sensors Cs each have a capacitance formed in each electrode 31. In a self-capacitance sensing method, when a touch driving signal is applied to the electrode 31 through the sensor line 32, charges Q are accumulated on the touch sensor Cs. In this instance, when a finger or a conductive object touches the electrode 31, a parasitic capacitance Cf is additionally connected to the self-capacitance sensor Cs, causing a total capacitance value to be changed. Because a capacitance of a sensor touched by the finger or the conductive object is different from a capacitance of a sensor which is not touched by the finger or the conductive object, whether or not a touch input is performed may be determined.

The touch sensors Cm or Cs of the touch screen TSP may be embedded in a pixel array of a display panel DIS. A common electrode of pixels may be divided into a plurality of segments, so as to embed the touch sensors Cm or Cs in the pixel array. In this instance, the touch sensors Cm or Cs may be implemented by divided common electrodes. Each common electrode segment may be commonly connected to the plurality of pixels and may form a touch sensor. During a display driving period, a common voltage is applied to the common electrode of the pixels. During a touch driving period, a touch driving signal and a pen driving signal are applied to the common electrode of the pixels.

The touch driving device 18 senses changes in charges of the touch sensor, determines whether or not a conductive material such as a finger (or a stylus pen) touches the touch screen TSP, detects a touch location when a touch input is performed, and calculates a coordinate value XY of the touch input. Further, the touch driving device 18 senses changes in charges of the touch sensor and generates information PAF about an additional function of the active stylus pen 20. The additional information PAF of the active stylus pen 20 includes pen pressure information, information about whether to use a button function (for example, an eraser function, a barrel function, etc.), and ID information.

The display module may include the display panel DIS, a display driving circuit (12, 14, and 16), and a host system 19.

The display panel DIS includes a liquid crystal layer between an upper substrate and a lower substrate. The pixel array of the display panel DIS includes pixels formed in pixel areas defined by data lines D1 to Dm and gate lines G1 to Gn, where m and n are a positive integer. Each pixel may include thin film transistors (TFTs) formed at crossings of the data lines D1 to Dm and the gate lines G1 to Gn, a pixel electrode charged with the data voltage, a storage capacitor that is connected to the pixel electrode and holds a voltage of a liquid crystal cell, and the like.

Black matrixes, color filters, etc. may be formed on the upper substrate of the display panel DIS. The lower substrate of the display panel DIS may be configured in a COT (color filter on TFT) structure. In this instance, the black matrixes and the color filters may be formed on the lower substrate of the display panel DIS. A common electrode supplied with the common voltage may be formed on the upper substrate or the lower substrate of the display panel DIS. Polarizing plates are respectively attached to the upper substrate and the lower substrate of the display panel DIS. Alignment layers for setting a pre-tilt angle of liquid crystals are respectively formed on the inner surfaces contacting the liquid crystals in the upper substrate and the lower substrate of the display panel DIS. A column spacer is formed between the upper substrate and the lower substrate of the display panel DIS to keep a cell gap of the liquid crystal cells constant.

A backlight unit may be disposed under a back surface of the display panel DIS. The backlight unit may be implemented as one of an edge type backlight unit and a direct type backlight unit and may irradiate light onto the display panel DIS. The display panel DIS may be implemented in any known mode including a twisted nematic (TN) mode, a vertical alignment (VA) mode, an in-plane switching (IPS) mode, a fringe field switching (FFS) mode, etc.

The display driving circuit includes a data driving circuit 12, a gate driving circuit 14, and a timing controller 16. The display driving circuit writes video data of an input image to the pixels of the display panel DIS. The data driving circuit 12 converts digital video data RGB received from the timing controller 16 into positive and negative analog gamma compensation voltages and outputs a data voltage. The data driving circuit 12 then supplies the data voltage to the data lines D1 to Dm. The gate driving circuit 14 sequentially supplies a gate pulse (or a scan pulse) synchronized with the data voltage to the gate lines G1 to Gn and selects pixel lines of the display panel DIS supplied with the data voltage.

The timing controller 16 synchronizes operation timing of the data driving circuit 12 with operation timing of the gate driving circuit 14 based on timing signals, such as a vertical sync signal Vsync, a horizontal sync signal Hsync, a data enable signal DE, and a main clock MCLK, received from the host system 19. The timing controller 16 generates a data timing control signal and a scan timing control signal for respectively controlling the operation timings of the data driving circuit 12 and the gate driving circuit 14 using the timing signals. The data timing control signal includes a source sampling clock SSC, a source output enable signal SOE, a polarity control signal POL, etc. The scan timing control signal includes a gate start pulse GSP, a gate shift clock GSC, a gate output enable signal GOE, etc.

The host system 19 may transmit the digital video data RGB and the timing signals Vsync, Hsync, DE, and MCLK to the timing controller 16 and execute an application program associated with touch coordinates information XY and the pen additional function input from the touch driving device 18.

Figure 6:
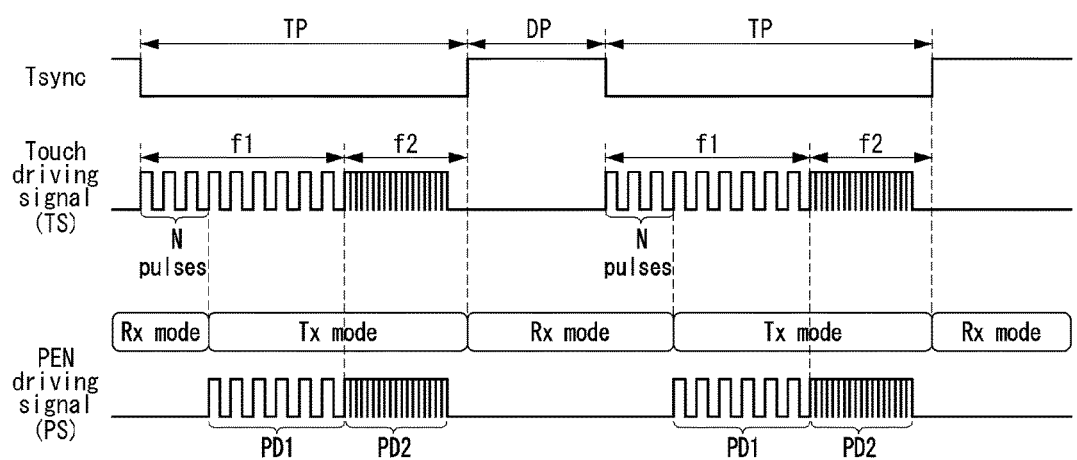
FIG. 6 illustrates that a first pen driving signal and a second pen driving signal are successively output to an active stylus pen according to an embodiment of the invention in synchronization with a touch driving signal during a touch driving period.

In the display device 10 according to the embodiment of the invention, one frame is time-divided into at least one touch driving period TP (see FIG. 6) and a display driving period DP (see FIG. 6). The touch driving period TP is a period in which a touch sync signal Tsync (see FIG. 6) is maintained at a first voltage level, and the display driving period DP is a period in which the touch sync signal Tsync (see FIG. 6) is maintained at a second voltage level. The touch sync signal Tsync may be generated in the timing controller 16 or the host system 19.

During the display driving period DP, the data driving circuit 12 supplies the data voltage to the data lines D1 to Dm under the control of the timing controller 16, and the gate driving circuit 14 sequentially supplies the gate pulse synchronized with the data voltage to the gate lines G1 to Gn under the control of the timing controller 16. During the display driving period DP, the touch driving device 18 stops operating.

During the touch driving period TP, the touch driving device 18 applies a touch driving signal to the touch sensors of the touch screen TSP. During the touch driving period TP, the display driving circuit (12, 14, and 16) may supply an AC signal having the same amplitude and the same phase as the touch driving signal to the signal lines D1 to Dm and G1 to Gm, so as to minimize a parasitic capacitance between the signal lines D1 to Dm and G1 to Gn connected to the pixels and the touch sensors. In this instance, a display noise mixed in the touch sensing signal significantly decreases, and the accuracy of touch sensing increases.

Figure 5:
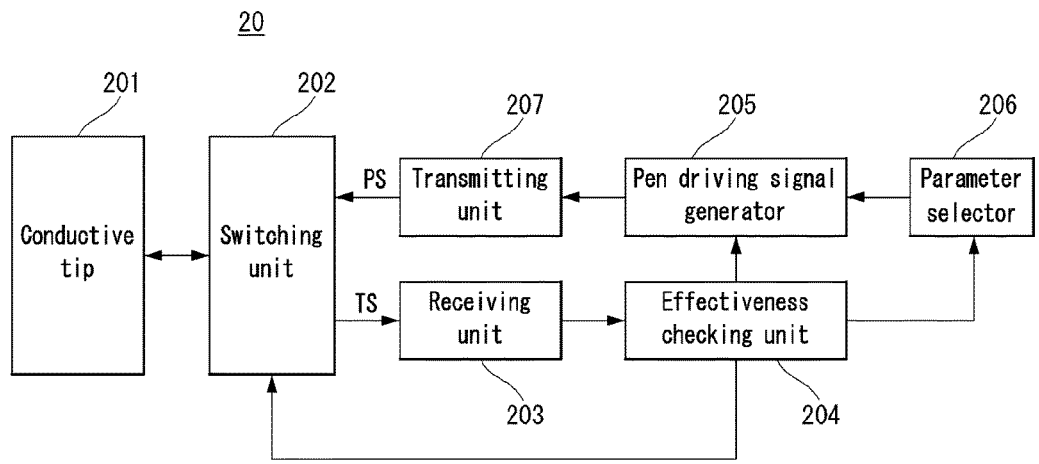
FIG. 5 illustrates an inner configuration of an active stylus pen according to an embodiment of the invention.
Figure 7:
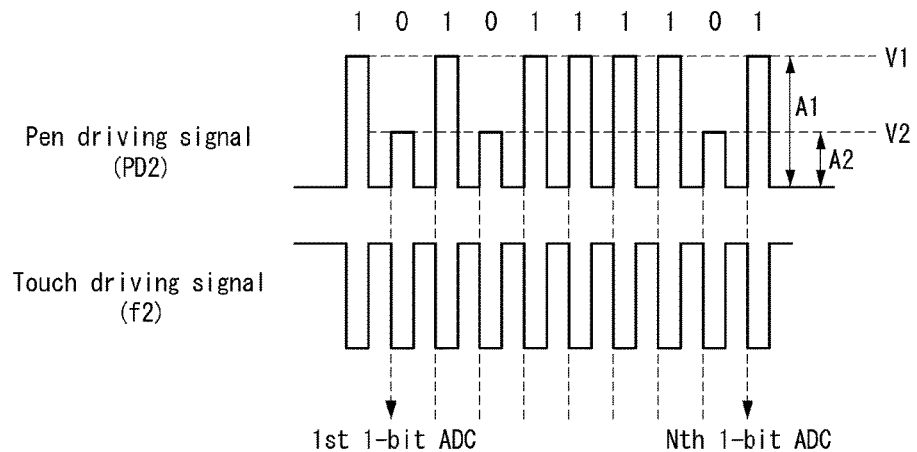
FIG. 7 illustrates a second pen driving signal that is generated in an active stylus pen according to an embodiment of the invention in synchronization with a touch driving signal through an amplitude modulation method.
Figure 8:
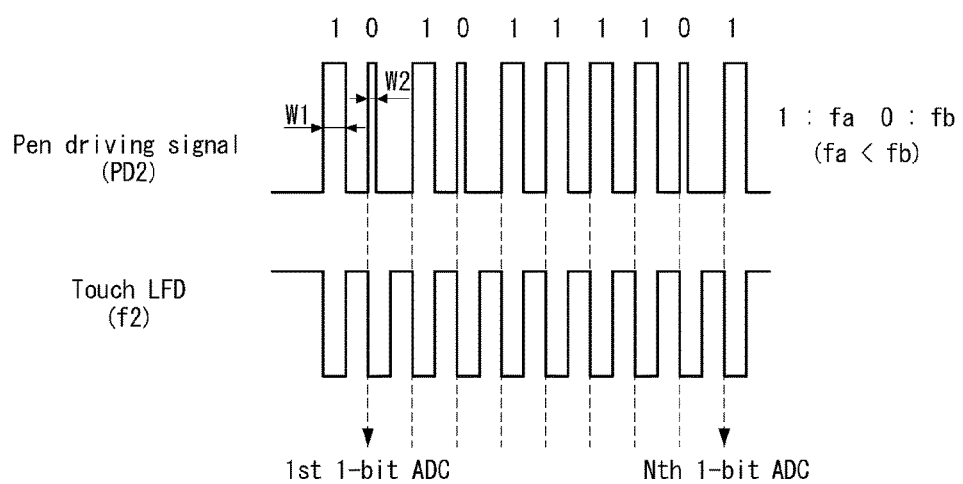
FIG. 8 illustrates a second pen driving signal that is generated in an active stylus pen according to an embodiment of the invention in synchronization with a touch driving signal through a frequency modulation method.

FIG. 5 illustrates an inner configuration of the active stylus pen according to the embodiment of the invention. FIG. 6 illustrates that a first pen driving signal and a second pen driving signal are successively outputs to the active stylus pen according to the embodiment of the invention in synchronization with a touch driving signal during a touch driving period. FIG. 7 illustrates a second pen driving signal that is generated in the active stylus pen according to the embodiment of the invention in synchronization with a touch driving signal using an amplitude modulation method. FIG. 8 illustrates a second pen driving signal that is generated in the active stylus pen according to the embodiment of the invention in synchronization with a touch driving signal using a frequency modulation method.

Referring to FIGS. 5 to 8, the active stylus pen 20 according to the embodiment of the invention includes a conductive tip 201, a switching unit 202 connected to the conductive tip 201, a receiving unit 203, an effectiveness checking unit 204, a pen driving signal generator 205, a parameter selector 206, and a transmitting unit 207. During the touch driving period TP, the active stylus pen 20 successively outputs a first pen driving signal PD1 and a second pen driving signal PD2 in synchronization with a touch driving signal TS.

The conductive tip 201 is made of a conductive material, for example, metal and serves as a receiving electrode and a transmitting electrode. When the conductive tip 201 is in contact with the touch screen TSP of the display device 10, the conductive tip 201 is coupled with the touch screen TSP at a contact location. After the conductive tip 201 receives a touch driving signal TS from the touch screen TSP at the contact location, the conductive tip 201 transmits a pen driving signal PS, that is generated inside the active stylus pen 20 so that it is synchronized with the touch driving signal TS, to the contact location of the touch screen TSP. Because the conductive tip 201 serves as the receiving electrode and the transmitting electrode, the active stylus pen 20 has an advantage of a simple structure.

When the conductive tip 201 is in contact with the touch screen TSP of the display device 10, the switching unit 202 temporally separates reception timing of the touch driving signal TS from transmission timing of the pen driving signal PS. The switching unit 202 transmits the touch driving signal TS input from the touch screen TSP to the receiving unit 203 through the conductive tip 201 in an Rx mode and transmits the pen driving signal PS generated in the pen driving signal generator 205 to the touch screen TSP through the conductive tip 201 in a Tx mode.

The receiving unit 203 includes at least one amplifier and a comparator and digitally processes the touch driving signal TS input through the switching unit 202.

After the effectiveness checking unit 204 receives the touch driving signal TS from the receiving unit 203, the effectiveness checking unit 204 analyzes the touch driving signal TS based on effective conditions of a predetermined default parameter set and checks the effectiveness of the touch driving signal TS. More specifically, as shown in FIG. 6, when N successive pulses of a touch driving signal TS satisfy the effective conditions (for example, an effective period PE and an effective duty DT) of the predetermined default parameter set, the effectiveness checking unit 204 may determine the touch driving signal TS to be effective, where N is a positive integer equal to or greater than 2. In this instance, the effectiveness checking unit 204 changes the switching unit 202 from the Rx mode to the Tx mode.

When the effectiveness checking unit 204 determines the touch driving signal TS to be effective, the pen driving signal generator 205 generates a pen driving signal PS synchronized with the touch driving signal TS with reference to signal generation conditions of the default parameter set. In other words, the pen driving signal generator 205 may generate the pen driving signal PS synchronized with the touch driving signal TS based on the signal generation conditions (for example, a period, a duty, the number, etc.) of the default parameter set that is loaded to a register after a predetermined time passed from a conversion time point of the Tx mode.

Figure 11:
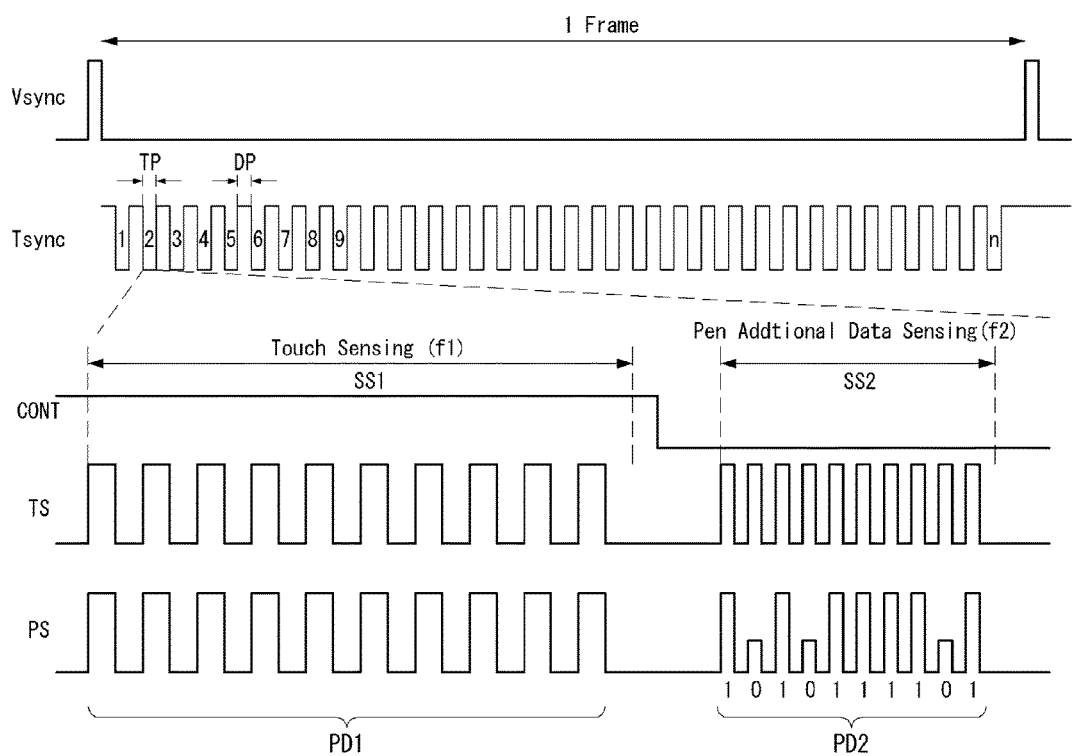
FIGS. 11 and 12 are waveform diagrams illustrating operation timing of a touch driving device shown in FIG. 9.

The pen driving signal PS includes a first pen driving signal PD1 for detecting a touch input and a second pen driving signal PD2 for detecting an additional input related to an additional function of the active stylus pen 20. The first pen driving signal PD1 is synchronized with a component of a first frequency f1 of the touch driving signal TS, and the second pen driving signal PD2 is synchronized with a component of a second frequency f2 of the touch driving signal TS. The touch driving signal TS may be input at the first frequency f1 during a first period of a touch driving period TP and may be input at the second frequency f2 during a second period of the touch driving period TP. In embodiments of the invention, the first frequency f1 and the second frequency f2 may be different from each other as shown in FIG. 11, and may be substantially the same as each other as shown in FIG. 12.

Figure 12:
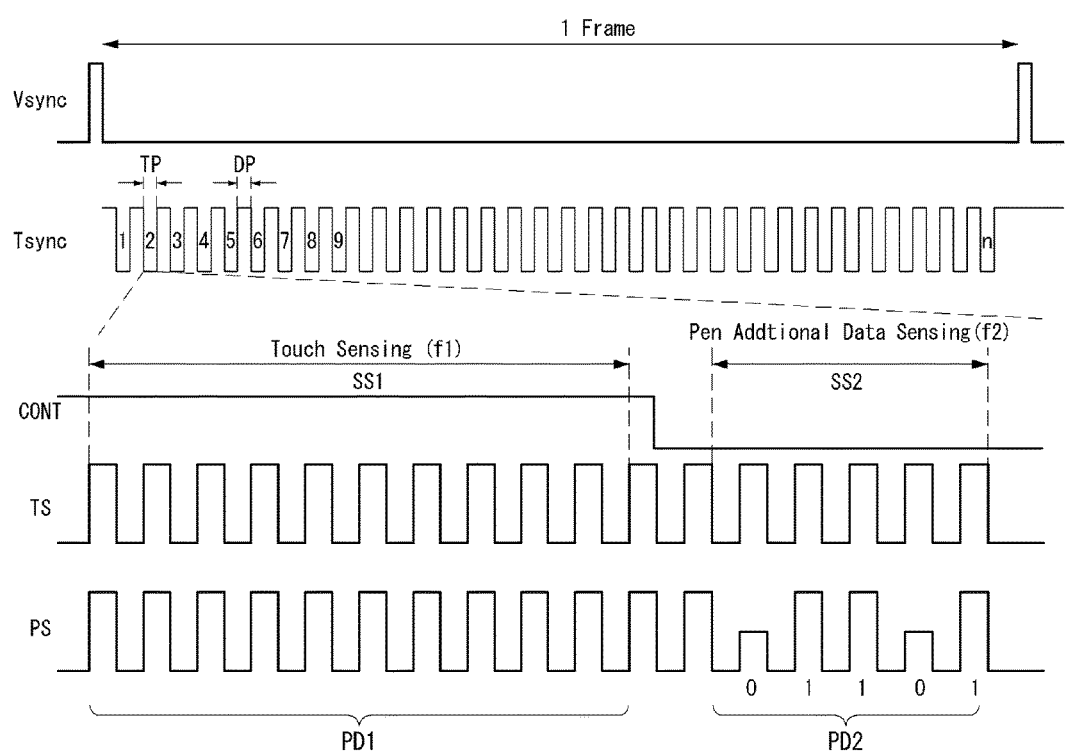

Referring to FIG. 12, when the first frequency f1 and the second frequency f2 are the same as each other, the second pen driving signal PD2 has the same frequency as the first pen driving signal PD1. On the other hand, referring to FIG. 11, when the first frequency f1 and the second frequency f2 are different from each other, the second pen driving signal PD2 has a frequency different from the first pen driving signal PD1. In order to transmit much more information about the additional function during a fixed duration of the second period, the second pen driving signal PD2 may have a frequency higher than the first pen driving signal PD1 by causing the second frequency f2 to be higher than the first frequency f1.

The pen driving signal generator 205 may generate the second pen driving signal PD2 in synchronization with the component of the second frequency f2 of the touch driving signal TS through an amplitude modulation method shown in FIG. 7. The pen driving signal generator 205 implements various additional functions, that are previously determined, by the second pen driving signal PD2 using a first voltage level V1 indicating digital information "1" and a second voltage level V2 that indicates digital information "0" and is less than the first voltage level V1. According to the amplitude modulation method, the second pen driving signal PD2 may be configured by various combinations of the first voltage level V1 and the second voltage level V2, for example, various combinations of first pulses each having a first amplitude A1 and second pulses each having a second amplitude A2. The pen driving signal generator 205 may generate the second pen driving signal PD2 in synchronization with the component of the second frequency f2 of the touch driving signal TS through a frequency modulation method shown in FIG. 8. The pen driving signal generator 205 implements various additional functions, that are previously determined, by the second pen driving signal PD2 using a first frequency fa indicating digital information "1" and a second frequency fb that indicates digital information "0" and is faster than the first frequency fa. According to the frequency modulation method, the second pen driving signal PD2 may be configured by various combinations of the first frequency fa and the second frequency fb, for example, various combinations of first pulses each having a first pulse width W1 and second pulses each having a second pulse width W2. Because a width and a frequency in the second pen driving signal PD2 are inversely proportional to each other, a pulse width W1 related to the first frequency fa is greater than a pulse width W2 related to the second frequency fb.

More specifically, when the touch driving signal TS has the same frequency in a first period SS1 and a second period SS2 as shown in FIG. 12, the second pen driving signal PD2 has the same frequency as the first pen driving signal PD1, and also includes a plurality of first pulses each having a first amplitude A1 and a plurality of second pulses each having a second amplitude A2 different from the first amplitude A1 as shown in FIG. 7.

Further, when the touch driving signal TS has the same frequency in the first period SS1 and the second period SS2 as shown in FIG. 12, the second pen driving signal PD2 has the same frequency as the first pen driving signal PD1, and also includes a plurality of first pulses each having a first pulse width W1 and a plurality of second pulses each having a second pulse width W2 different from the first pulse width W1 as shown in FIG. 8.

When the touch driving signal TS has a higher frequency in a second period SS2 than in a first period SS1 as shown in FIG. 11, the second pen driving signal PD2 has a frequency higher than the first pen driving signal PD1, and also includes a plurality of first pulses each having a first amplitude A1 and a plurality of second pulses each having a second amplitude A2 different from the first amplitude A1 as shown in FIG. 7.

Further, when the touch driving signal TS has a higher frequency in the second period SS2 than in the first period SS1 as shown in FIG. 11, the second pen driving signal PD2 has a frequency higher than the first pen driving signal PD1, and also includes a plurality of first pulses each having a first pulse width W1 and a plurality of second pulses each having a second pulse width W2 different from the first pulse width W1 as shown in FIG. 8.

The transmitting unit 207 includes a level shifter. Thus, the transmitting unit 207 amplifies a voltage level of the pen driving signal PS input from the pen driving signal generator 205 and then applies the amplified pen driving signal PS to the switching unit 202.

Figure 9:
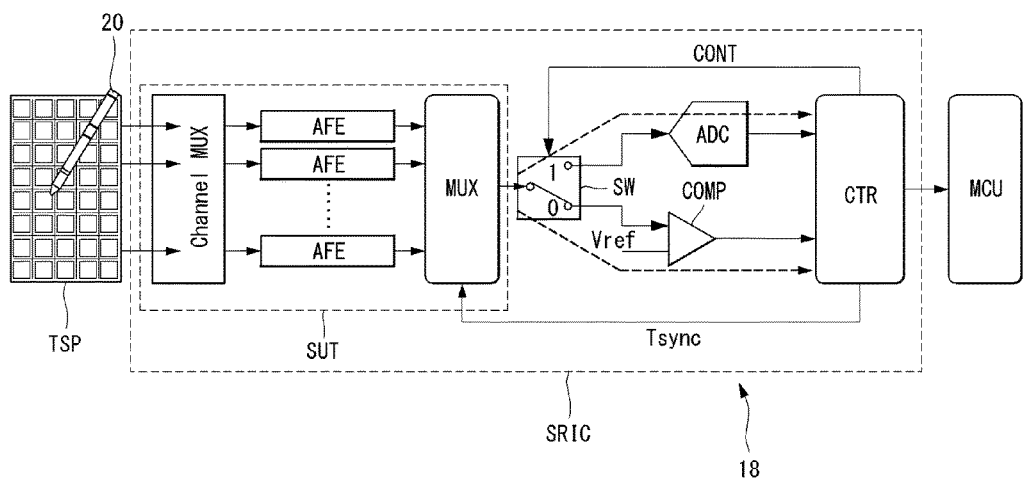
FIG. 9 illustrates a touch driving device included in a display device shown in FIG. 2.
Figure 10:
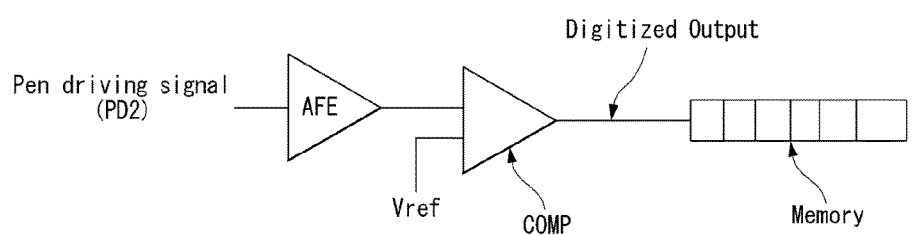
FIG. 10 illustrates a configuration of a touch driving device shown in FIG. 9 for digitally processing a sensing value of a second pen driving signal.

FIG. 9 illustrates the touch driving device included in the display device shown in FIG. 2. FIG. 10 illustrates a configuration of the touch driving device for digitally processing a sensing value of a second pen driving signal. FIGS. 11 and 12 are waveform diagrams illustrating operation timing of the touch driving device shown in FIG. 9.

The touch driving device 18 according to the embodiment of the invention may be implemented by an integrated circuit (IC) package.

Referring to FIGS. 9 to 12, the touch driving device 18 includes a touch integrated IC SRIC and a microcontroller unit MCU. The touch integrated IC SRIC includes a sensing unit SUT, an analog-to-digital converter ADC, a comparator COMP, a digital controller CTR, a switching unit SW, etc.

The sensing unit SUT is connected to the sensor lines of the touch screen TSP and applies the touch driving signal TS to the touch screen TSP. Further, the sensing unit SUT senses a touch input resulting from the first pen driving signal PD1 and senses an additional pen input resulting from the second pen driving signal PD2. To this end, the sensing unit SUT includes a touch driving signal supply unit (not shown), a touch sensor channel unit (or a channel multiplexer), a plurality of sensing units AFE, and a multiplexer unit MUX. The touch sensor channel unit is connected to electrodes of the touch sensors through the sensor lines (or the Rx electrode lines). The touch sensor channel unit connects the sensor lines to the sensing units AFE. The sensing units AFE sense an amount of charges of the touch sensors input through the sensor lines. The sensing units AFE sense an amount of charges resulting from the first pen driving signal PD1 input through the touch screen TSP during a first period SS1 of a touch driving period TP and sense an amount of charges resulting from the second pen driving signal PD2 input through the touch screen TSP during a second period SS2 of the touch driving period TP following the first period SS1. The multiplexer unit MUX selectively connects each of the sensing units AFE to the switching unit SW in first to nth touch driving periods (see FIGS. 11 and 12) in response to a touch sync signal Tsync.

The switching unit SW is turned on and off in response to a time division control signal CONT from the digital controller CTR. The switching unit SW connects an output terminal of the sensing unit SUT to an input terminal of the analog-to-digital converter ADC during a first period SS1 of each of the first to nth touch driving periods. Further, the switching unit SW connects the output terminal of the sensing unit SUT to an input terminal of the comparator COMP during a second period SS2 of each of the first to nth touch driving periods.

During the first period SS1 of each of the first to nth touch driving periods, the analog-to-digital converter ADC converts an analog sensing value (namely, an amount of charges resulting from the first pen driving signal PD1) corresponding to a touch input into a digital touch sensing value.

During the second period SS2 of each of the first to nth touch driving periods, the comparator COMP compares an analog sensing value (namely, an amount of charges resulting from the second pen driving signal PD2) corresponding to an additional input with a predetermined reference value Vref and generates a digital additional sensing value. When the second pen driving signal PD2 is configured by a combination of the first voltage level V1 and the second voltage level V2 in accordance with the amplitude modulation method shown in FIG. 7, an amount of charges resulting from the first voltage level V1 may be greater than the reference value Vref and thus may be generated as digital information "1", and an amount of charges resulting from the second voltage level V2 may be less than the reference value Vref and thus may be generated as digital information "0". Further, when the second pen driving signal PD2 is configured by a combination of the first frequency fa and the second frequency fb in accordance with the frequency modulation method shown in FIG. 8, an amount of charges resulting from the first frequency fa may be greater than the reference value Vref and thus may be generated as digital information "1", and an amount of charges resulting from the second frequency fb may be less than the reference value Vref and thus may be generated as digital information "0".

The digital controller CTR stores the digital touch sensing value from the analog-to-digital converter ADC in a first memory and stores the digital additional sensing value from the comparator COMP in a second memory. The digital controller CTR generates the time division control signal CONT for dividing each of the first to nth touch driving periods into a first period SS1 and a second period SS2 and supplies the time division control signal CONT to the switching unit SW. The digital controller CTR transmits the digital touch sensing value stored in the first memory and the digital additional sensing value stored in the second memory to the microcontroller unit MCU through a serial peripheral interface (SPI).

The microcontroller unit MCU calculates a coordinate value of a touch input based on the digital touch sensing value and generates information about the additional function of the active stylus pen based on the digital additional sensing value. The microcontroller unit MCU then transmits touch coordinate information XY and information PAF about the pen additional function to the host system.

Figure 13:
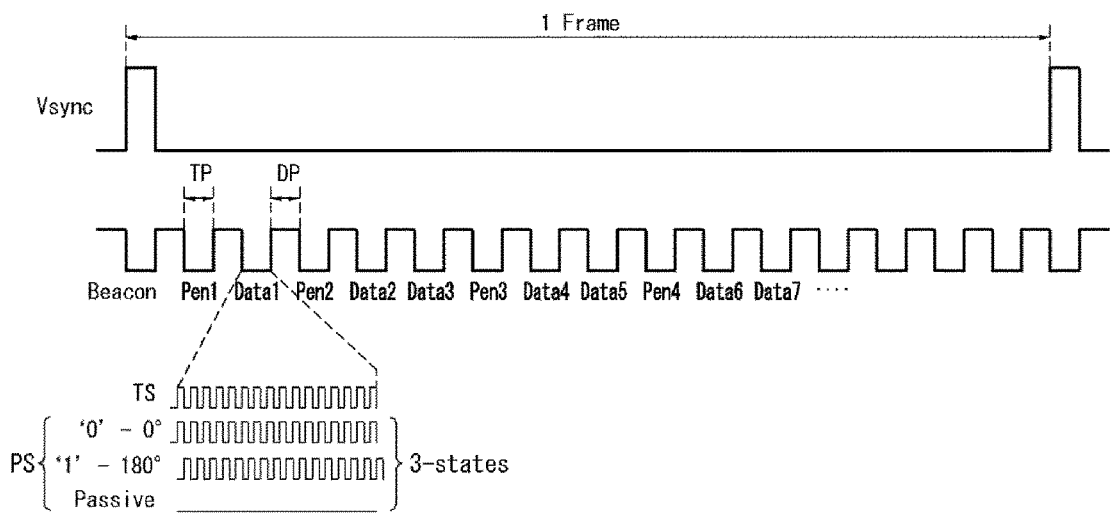
FIGS. 13 and 14 illustrate a second pen driving signal generated in three states in synchronization with a touch driving signal in an active stylus pen according to an embodiment of the invention.
Figure 14:
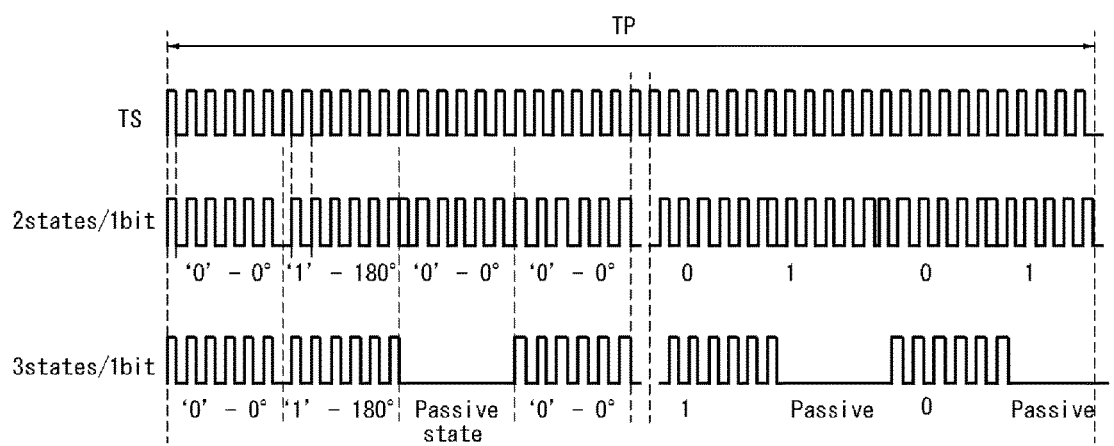

FIGS. 13 and 14 illustrate a second pen driving signal generated in three states in synchronization with a touch driving signal in the active stylus pen according to the embodiment of the invention. FIG. 15 illustrates an amount of information that can be transmitted when a second pen driving signal is generated in three states.

Referring to FIGS. 13 and 14, the active stylus pen generates first pen driving signals Pen1, . . . , Pen4, . . . , in some of touch driving periods TP of one frame and generates second pen driving signals Data1, . . . , Data6, . . . , in remaining touch driving periods TP of one frame. The first pen driving signals Pen1, . . . , Pen4, . . . , and the second pen driving signals Data1, . . . , Data6, . . . , are output to the touch screen with a display driving period DP interposed between them. A first period of the touch driving period, in which the first pen driving signals Pen1, . . . , Pen4, . . . , are generated, and a second period of the touch driving period, in which the second pen driving signals Data1, . . . , Data6, . . . , are generated, are disposed in different touch driving periods TP with the display driving period DP interposed between them.

When the second pen driving signals Data1, . . . , Data6, . . . , indicating an additional input related to a pen additional function are output to the touch screen in a separate touch driving period TP, the sensing sensitivity of the additional input can be improved. Furthermore, because the first pen driving signals Pen1, . . . , Pen4, . . . , and the second pen driving signals Data1, . . . , Data6, . . . , are output to the touch screen with the display driving period DP interposed between them, sensing data may be processed during the display driving period DP. Hence, time required in the data processing can be sufficiently secured.

The second pen driving signals Data1, Data6, . . . , may have three states so as to increase a transmission amount of information about the additional input. For example, the second pen driving signals Data1, Data6, . . . , of the three states may include first state (indicated by '0') signals having the same phase as a touch driving signal TS, second state (indicated by '1') signals having a phase opposite the touch driving signal TS, and third state (indicated by 'passive') signals for not driving the active stylus pen.

When the second pen driving signals Data1, Data6, . . . , are implemented in the three states, much more information about the additional function can be transmitted using limited data amount because the embodiment of the invention can create an effect of 3-bit data using 2-bit data. Hence, it is easy to achieve a high performance of the active stylus pen. Further, because the second pen driving signals of the three states can achieve the same performance for a shorter driving time compared to when the second pen driving signals are implemented in two states ('0' and '1'), the second pen driving signals of the three states are effective in a reduction in power consumption.

For example, as shown in FIG. 15, when the second pen driving signals Data1, Data6, . . . , are implemented in the three states, 27 informations can be transmitted in case of three symbols. On the other hand, when the second pen driving signals Data1, Data6, are implemented in the two states, only eight informations can be transmitted in case of three symbols.

Although not shown in FIGS. 13 and 14, the touch driving signal TS may have the same frequency in the first period of the touch driving period in which the first pen driving signals Pen1, Pen4, . . . , are generated, and the second period of the touch driving period in which the second pen driving signals Data1, . . . , Data6, . . . , are generated.

In this instance, the second pen driving signals Data1, Data6, . . . , may have the same frequency as the first pen driving signals Pen1, . . . , Pen4, . . . , and may also include first state (indicated by '0') signals having the same phase as the touch driving signal TS, second state (indicated by '1') signals having a phase opposite the touch driving signal TS, and third state (indicated by 'passive') signals for not driving the active stylus pen.

Although not shown in FIGS. 13 and 14, the touch driving signal TS may have a higher frequency in the second period of the touch driving period, in which the second pen driving signals Data1, . . . , Data6, . . . , are generated, than in the first period of the touch driving period in which the first pen driving signals Pen1, . . . , Pen4, . . . , are generated.

In this instance, the second pen driving signals Data1, . . . , Data6, . . . , may have a frequency higher than the first pen driving signals Pen1, . . . , Pen4, . . . , and may also include first state (indicated by '0') signals having the same phase as the touch driving signal TS, second state (indicated by '1') signals having a phase opposite the touch driving signal TS, and third state (indicated by 'passive') signals for not driving the active stylus pen.

In FIG. 13, 'Beacon' indicates a signal instructing the active stylus pen of a pen frequency, a pen driving method (for example, contact, hovering, etc.), a driving status (for example, a basic drive, a low power drive, etc.) of the display panel, etc.

The embodiment of the invention has the following effects.

Firstly, the embodiment of the invention can accurately receive digital additional information (for example, a pressure, a button, a pen ID, etc.) transmitted from the pen by adding a circuit for digitally processing a sensing value of a second pen driving signal to an existing in-cell touch driving device.

Secondly, because the embodiment of the invention temporally separates and outputs a touch driving signal including a first pen driving signal and a second pen driving signal, more accurate information can be transmitted.

Thirdly, the embodiment of the invention can transmit information about a pen pressure equal to or greater than 2048 through digital additional information at the same rate as a touch report rate.

Fourthly, the embodiment of the invention can transmit two or more button informations (including eraser information, barrel information, etc.) through digital additional information.

Fifthly, the embodiment of the invention can transmit the pen ID through digital additional information, and at the same time can recognize a plurality of pens.

Sixthly, the embodiment of the invention can process digital additional information to 3-stage and transfer much more information in a limited time.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A touch sensing system, in which one frame is time-divided into at least one touch driving period and a display driving period, the touch sensing system comprising:
    a display panel including a plurality of common electrodes implemented as touch sensors, the touch sensors being configured to apply a common voltage to the plurality of common electrodes during the display driving period;
    an active stylus pen configured to:
        generate:
            a first pen driving signal in synchronization with a touch driving signal, the first pen driving signal being related to a touch input of the active stylus pen; and
            a second pen driving signal related to one or more of: pen pressure information, information about whether to use a button function, and identification (ID) information of the active stylus pen; and
        output, to the display panel, the first pen driving signal in a first period and the second pen driving signal in a second period, the first period and the second period being included in a same touch driving period,
        wherein during the touch driving period the first pen driving signal and the second pen driving signal output from the active stylus pen and the touch driving signal are applied to the plurality of common electrodes; and
    a touch driving device configured to:
        sense the first pen driving signal input through the display panel in the first period of the same touch driving period; and
        sense the second pen driving signal input through the display panel in the second period of the same touch driving period,
    wherein a conductive tip of the active stylus pen is configured to output the first pen driving signal and the second pen driving signal to the display panel,
    wherein the second pen driving signal includes a plurality of state signals, the plurality of state signals including:
        a first state signal,
        a second state signal, and
        a third state signal, and
    wherein:
        the first state signal includes a plurality of pulses having a same phase as the touch driving signal,
        the second state signal includes a plurality of pulses having a phase opposite the touch driving signal, and
        the third state signal is a passive state of the second pen driving signal.

2. The touch sensing system of claim 1, wherein the active stylus pen is further configured to generate the second pen driving signal in synchronization with the touch driving signal through an amplitude modulation method or a pulse width modulation method.

3. A touch sensing system, in which one frame is time-divided into at least one touch driving period and a display driving period, the touch sensing system comprising:
    a display panel including a plurality of common electrodes implemented as touch sensors, the touch sensors being configured to apply a common voltage to the plurality of common electrodes during the display driving period;
    an active stylus pen configured to:
        generate:
            a first pen driving signal in synchronization with a touch driving signal, the first pen driving signal being related to a touch input of the active stylus pen; and
            a second pen driving signal related to one or more of: pen pressure information, information about whether to use a button function, and identification (ID) information of the active stylus pen; and
        output, to the display panel, the first pen driving signal in a first period and the second pen driving signal in a second period; and
    a touch driving device configured to:
        sense the first pen driving signal input through the display panel in the first period; and
        sense the second pen driving signal input through the display panel in the second period,
    wherein the first period and the second period are in different touch driving periods, with the display driving period between them,
    wherein a conductive tip of the active stylus pen is configured to output the first pen driving signal and the second pen driving signal to the display panel,
    wherein the second pen driving signal includes a plurality of state signals, the plurality of state signals including:
        a first state signal,
        a second state signal, and
        a third state signal, and
    wherein:
        the first state signal includes a plurality of pulses having a same phase as the touch driving signal,
        the second state signal includes a plurality of pulses having a phase opposite the touch driving signal, and
        the third state signal is a passive state of the second pen driving signal.

4. The touch sensing system of claim 1, wherein the touch driving device includes:
    a sensing unit connected to sensor lines of the display panel and configured to:
        sense the touch input resulting from the first pen driving signal; and sense the additional input resulting from the second pen driving signal;
an analog-to-digital converter configured to convert an analog sensing value corresponding to the touch input into a digital touch sensing value;
a comparator configured to:
compare an analog sensing value corresponding to the additional input with a predetermined reference value; and
generate a digital additional sensing value;
a digital controller configured to:
store the digital touch sensing value in a first memory;
store the digital additional sensing value in a second memory; and
generate a time division control signal for dividing each touch driving period into the first period and the second period;
a switching unit configured to:
be turned on and off in response to the time division control signal;
connect the sensing unit to the analog-to-digital converter during the first period; and
connect the sensing unit to the comparator during the second period; and
a microcontroller unit configured to:
calculate a coordinate value of the touch input based on the digital touch sensing value; and
generate information about the additional function of the active stylus pen based on the digital additional sensing value.

5. A display device, in which one frame is time-divided into at least one touch driving period and a display driving period and configured to operate in the at least one touch driving period, the display device comprising:
a display panel including a plurality of common electrodes implemented as touch sensors, the touch sensors being configured to:
during the display driving period, apply a common voltage to the plurality of common electrodes; and
during the touch driving period, apply a touch driving signal, a first pen driving signal, and a second pen driving signal to the plurality of common electrodes; and
a touch driving device configured to:
sense the first pen driving signal output from an active stylus pen in a first touch driving period, and
sense the second pen driving signal output from the active stylus pen in a second touch driving period,
wherein the first pen driving signal and the second pen driving signal are synchronized with the touch driving signal,
wherein the first pen driving signal is used to detect a touch input of the active stylus pen,
wherein the second pen driving signal is used to detect an additional input related to an additional function of the active stylus pen, the additional input including one or more of: pen pressure information, information about whether to use a button function, and identification (ID) information of the active stylus pen,
wherein a conductive tip of the active stylus pen is configured to output the first pen driving signal and the second pen driving signal to the display panel,
wherein the second pen driving signal includes a plurality of state signals, the plurality of state signals including:
a first state signal,
a second state signal, and
a third state signal, and
wherein:
the first state signal includes a plurality of pulses having a same phase as the touch driving signal,
the second state signal includes a plurality of pulses having a phase opposite the touch driving signal, and
the third state signal is a passive state of the second pen driving signal.

6. The display device of claim 5, wherein the second pen driving signal is generated in synchronization with the touch driving signal through an amplitude modulation method or a pulse width modulation method.

7. The display device of claim 5, wherein the first touch driving period and the second touch driving period are in different touch driving periods, with the display driving period between them.

8. The display device of claim 5, wherein the touch driving device comprises:
a sensing unit connected to sensor lines of the display panel and configured to:
sense the touch input resulting from the first pen driving signal; and
sense the additional input resulting from the second pen driving signal;
an analog-to-digital converter configured to convert an analog sensing value corresponding to the touch input into a digital touch sensing value;
a comparator configured to:
compare an analog sensing value corresponding to the additional input with a predetermined reference value; and
generate a digital additional sensing value;
a digital controller configured to:
store the digital touch sensing value in a first memory;
store the digital additional sensing value in a second memory; and
generate a time division control signal for dividing each touch driving period into the first period and the second period;
a switching unit configured to:
be turned on and off in response to the time division control signal;
connect the sensing unit to the analog-to-digital converter during the first period; and
connect the sensing unit to the comparator during the second period; and
a microcontroller unit configured to:
calculate a coordinate value of the touch input based on the digital touch sensing value; and
generate information about the additional function of the stylus pen based on the digital additional sensing value.

9. The touch sensing system of claim 3, wherein the active stylus pen is further configured to generate the second pen driving signal in synchronization with the touch driving signal through an amplitude modulation method or a pulse width modulation method.

10. The touch sensing system of claim 1, wherein:
the display panel is configured to output a beacon signal to the active stylus pen during a first level of vertical sync signal of the touch sensing system; and
the beacon signal includes at least one of: a pen frequency of the active stylus pen, the active stylus pen driving information, and the display panel driving information.

11. The touch sensing system of claim 3, wherein:
the display panel is configured to output a beacon signal to the active stylus pen during a first level of vertical sync signal of the touch sensing system; and
the beacon signal includes at least one of: a pen frequency of the active stylus pen, the active stylus pen driving information, and the display panel driving information.

12. The display device of claim 5, wherein:
the display panel is configured to output a beacon signal to the active stylus pen during a first level of vertical sync signal of the display device; and
the beacon signal includes at least one of: a pen frequency of the active stylus pen, the active stylus pen driving information, or the display panel driving information.

* * * * *